US009056290B2

(12) United States Patent
Ozawa et al.

(10) Patent No.: US 9,056,290 B2
(45) Date of Patent: Jun. 16, 2015

(54) KNEADING SYSTEM WITH CLOSED-TYPE RUBBER KNEADER

(71) Applicant: The Yokohama Rubber Co., LTD., Minato-ku, Tokyo (JP)

(72) Inventors: Osamu Ozawa, Hiratsuka (JP); Yasuaki Shinoda, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/380,044

(22) PCT Filed: Jan. 30, 2013

(86) PCT No.: PCT/JP2013/052050
§ 371 (c)(1),
(2) Date: Aug. 20, 2014

(87) PCT Pub. No.: WO2013/125314
PCT Pub. Date: Aug. 29, 2013

(65) Prior Publication Data
US 2015/0117134 A1    Apr. 30, 2015

(30) Foreign Application Priority Data
Feb. 20, 2012    (JP) .................................. 2012-033778

(51) Int. Cl.
*B29B 7/28*      (2006.01)
*B01F 15/00*     (2006.01)
(Continued)

(52) U.S. Cl.
CPC ....... *B01F 15/00201* (2013.01); *B01F 7/00975* (2013.01); *B29B 7/10* (2013.01); *B29B 7/283* (2013.01); *B01F 2215/0049* (2013.01); *B29K 2021/003* (2013.01); *B29K 2507/04* (2013.01)

(58) Field of Classification Search
CPC .............................. B29B 7/183; B29B 7/283
USPC .................................. 366/76.7, 76.8, 97–99
See application file for complete search history.

(56) References Cited

U.S. PATENT DOCUMENTS 3,447,201 A * 6/1969 Seanor et al. ................. 366/76.2
3,951,389 A * 4/1976 Porter ............................ 366/91
(Continued)

FOREIGN PATENT DOCUMENTS

JP    H05-138649    6/1993
JP    2001-277236   10/2001
(Continued)

OTHER PUBLICATIONS

International Search Report dated Feb. 26, 2013, 4 pages, Japan.
(Continued)

*Primary Examiner* — David Sorkin
(74) *Attorney, Agent, or Firm* — Thorpe North & Western

(57) ABSTRACT

The system includes: a closed-type rubber kneader that kneads kneading materials that include raw rubber and carbon black; a rotation meter of a rotor; a power meter that measures the instantaneous power required to drive the rotation of the rotor; and a calculation device to which the measurement data is input. The calculation device calculates an evaluation index that evaluates the kneading efficiency of the kneader based on the total amount of shear calculated by integrating the shear velocity applied to the kneading materials by the rotor over the kneading time, and a unit work calculated by dividing the integrated power obtained by integrating the instantaneous power over the kneading time by the mass of the kneading materials.

8 Claims, 5 Drawing Sheets

(51) Int. Cl.
 *B01F 7/00* (2006.01)
 *B29B 7/10* (2006.01)
 *B29K 21/00* (2006.01)
 *B29K 507/04* (2006.01)

(56) References Cited

U.S. PATENT DOCUMENTS

| | | | | |
|---|---|---|---|---|
| 3,991,984 A | * | 11/1976 | Porter | 366/72 |
| 5,324,107 A | * | 6/1994 | Tanaka et al. | 366/76.3 |
| 5,865,535 A | * | 2/1999 | Edwards | 366/76.7 |
| 2003/0018113 A1 | | 1/2003 | Nakahama et al. | |
| 2007/0025176 A1 | * | 2/2007 | Naoi | 366/76.7 |
| 2014/0249250 A1 | * | 9/2014 | Miyasaka | 523/351 |

FOREIGN PATENT DOCUMENTS

| | | |
|---|---|---|
| JP | 2005-262725 | 9/2005 |
| WO | WO 01/57493 | 8/2001 |

OTHER PUBLICATIONS

Kazuo Nishimoto et al., Spectral Analysis of Electric Power Consumption Chart, 1992, 8 pages, Nippon Gomu Kyokaishi, vol. 65, No. 8, pp. 465-472, Japan.

* cited by examiner

US 9,056,290 B2

KNEADING SYSTEM WITH CLOSED-TYPE RUBBER KNEADER

TECHNICAL FIELD

The present technology relates to a kneading system with a closed-type rubber kneader, and more particularly relates to a kneading system with a closed-type rubber kneader capable of simply and accurately determining the extent of the kneading efficiency of the kneader.

BACKGROUND

When manufacturing rubber products such as tires, rubber hose, or the like, kneading materials that include various constituent materials such as, for example, raw rubber, carbon black, and the like, are placed in a closed-type rubber kneader and kneaded. As a result of this kneading, each of the constituent materials is uniformly dispersed within the raw rubber, and the viscosity of the kneading materials is reduced to a constant viscosity. Two rotors are disposed in parallel within a chamber in the closed-type rubber kneader, and these rotors are rotated to knead the kneading materials. The kneading materials are rotated about the rotor shaft as center, and are kneaded by a shear force applied between the rotor and the inner wall face of the chamber.

There are various types of closed-type rubber kneader with different specifications of rotor, rotor drive motor, chamber, and the like. In order to carry out kneading efficiently, it is desirable that a kneader suitable for the kneading materials is selected and used, or if an existing rubber kneader is used, preferably the kneading is carried out under conditions suitable for the kneading materials.

The method using the power-time curve of the kneader is known as a means for evaluating the state of kneading of a closed-type rubber kneader (for example, see Kazuo NISHIMOTO, Masaaki URABE, Tetsuo AKIYAMA: "Spectral Analysis of Power-Time Curve", Nippon Gomu Kyokaishi, Vol. 65, No. 8, pp 465-472, 1992, hereinafter referred to as "Nishimoto"). However, the method in this document is mainly for determining the state of kneading at a certain point in time, and it cannot evaluate the kneading efficiency of a closed-type rubber kneader.

For example, Nishimoto is not directly of reference for determining whether a kneader is suitable for efficiently kneading certain kneading materials, or, for determining under what conditions they can be efficiently kneaded. Accordingly, there is a demand for a kneading system capable of simply and accurately determining the extent of the kneading efficiency of a closed-type rubber kneader.

SUMMARY

The present technology provides a kneading system with a closed-type rubber kneader capable of simply and accurately determining the extent of the kneading efficiency of a kneader.

The kneading system with a closed-type rubber kneader according to the present technology comprises: a closed-type rubber kneader that kneads kneading materials that include raw rubber and carbon black; a rotation meter that measures the rate of rotation of a rotor of the kneader; a power meter that measures the instantaneous power required to drive the rotation of the rotor; and a calculation device to which the measurement data of the rotation meter and the power meter is input, wherein based on the input measurement data, data on the outer diameter of the rotor, data on the clearance between the position of the outer diameter of the rotor and the inner wall face of a chamber that contains the rotor, the calculation device calculates the total amount of shear by integrating the shear velocity applied to the kneading materials by the rotor over the kneading time, calculates a unit work by dividing the integrated power obtained by integrating the instantaneous power over the kneading time by the mass of the kneading materials, and based on the total amount of shear and the unit work, calculates an evaluation index that evaluates the kneading efficiency of the kneader.

According to the present technology, when kneading kneading materials that include raw rubber and carbon black using a closed-type rubber kneader, the total amount of shear calculated by integrating the shear velocity due to the rotor over the kneading time can be obtained to an accurate approximation based on the rotation meter measurement data (rate of rotation of the rotor), data on the outer diameter of the rotor, data on the clearance between the position of the outer diameter of the rotor and the inner wall face of a chamber that contains the rotor, and the kneading time. Also, it is possible to obtain the measurement value of the unit work by dividing the integrated power obtained by integrating the measurement data of the power meter (instantaneous power required to drive the rotation of the rotor) over the kneading time by the mass of kneading materials. Then, the calculation device calculates the evaluation index that evaluates the kneading efficiency of the kneader based on the total amount of shear and the unit work.

The total amount of shear is the so-called amount of work input when kneading, and the unit work is the so-called amount of work output when kneading. Then, the kneading efficiency is the work output relative to the work input when kneading, and these works can be easily determined as described above, so according to the present technology, it is possible to simply and accurately determine the extent of the kneading efficiency of that kneader.

In this case, the evaluation index can, for example, be calculated successively. Data on the position of a floating weight that is provided above the rotor, and when kneading is carried out, the floating weight is moved downward and arranged in a position to cover the top of the rotor and close the chamber, and when kneading materials are fed, it is moved upward to a standby position, can be input to the calculation device. A limiting value of the evaluation index in accordance with the mix of the kneading materials can be input to the calculation device, and the limiting value can be compared with the calculated evaluation index.

DETAILED DESCRIPTION

Figure 1:
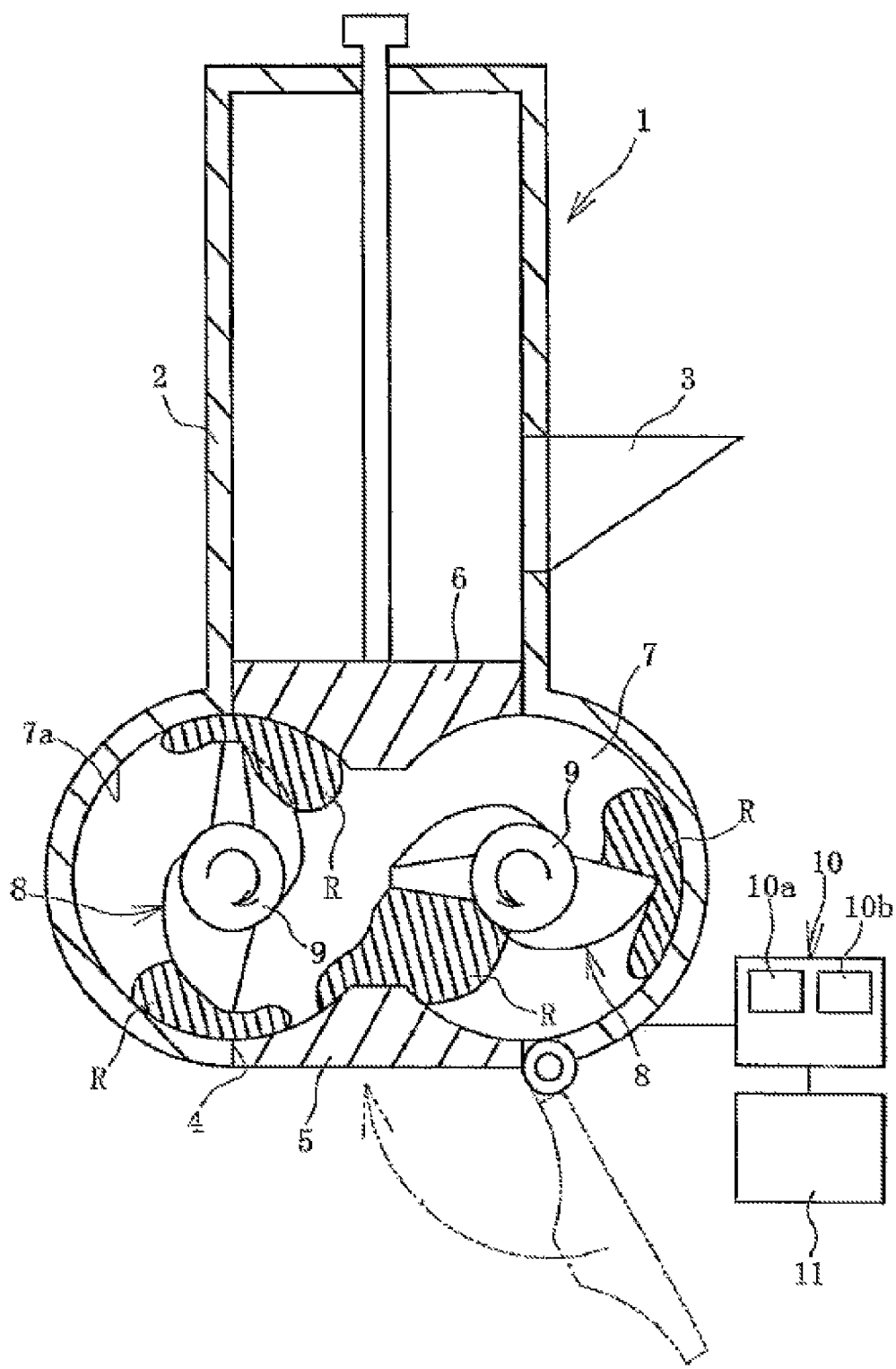
FIG. 1 is an overall schematic view of a kneading system of the present technology illustrated by a vertical cross-section of the interior of a closed-type kneader kneading kneading materials.

The following is a description of the kneading system with a closed-type rubber kneader according to the present technology based on embodiments illustrated in the drawings.

Figure 2:
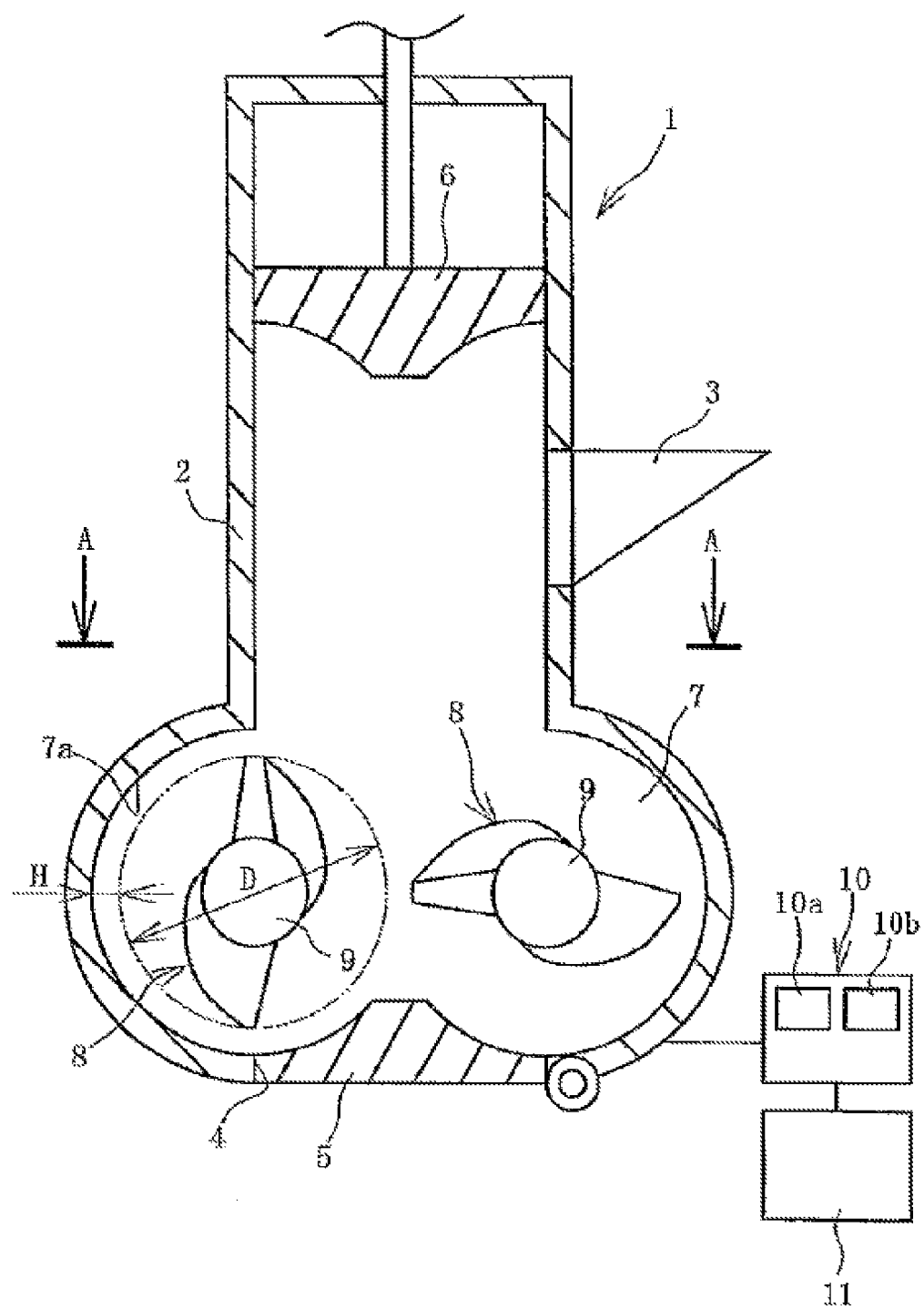
FIG. 2 is a vertical cross-sectional view illustrating the internal structure of the closed-type rubber kneader illustrated in FIG. 1.
Figure 3:
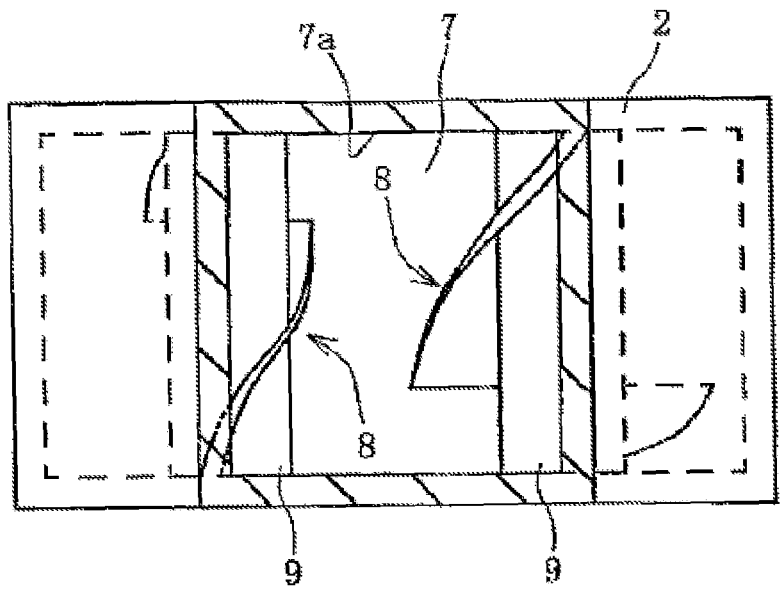
FIG. 3 is a cross-sectional view taken along A-A of FIG. 2.

As illustrated in FIGS. 1 to 3, a kneading system according to the present technology includes a closed-type rubber kneader 1 (hereinafter, referred to as kneader 1) that kneads kneading materials R that includes raw rubber and carbon black, a rotation meter 10a that measures the rate of rotation N of a rotor 8 of the kneader 1, a power meter 10b that measures the instantaneous power p required to drive the rotation of the rotor 8, and a calculation device 11 to which the measurement data of the rotation meter 10a and the power meter 10b are input.

The rotation meter 10a and the power meter 10b are provided in a rotor drive unit 10 that drives the rotation of a rotor shaft 9. The rotor drive unit 10 may be, for example, a drive motor or the like.

The kneader 1 includes a material feeding port 3 disposed partway in the vertical direction of a casing 2, and a chamber 7 that houses rotors 8 and a material discharge port 4 in the bottom of the casing 3. Two rotors 8 disposed in parallel are provided in the chamber 7. The two parallel rotors 8 disposed in parallel are driven to rotate in opposite directions about their respective rotor shafts 9 which are disposed in parallel.

The rate of rotation N of each rotor 8 can be varied, and can be set to a desired rate of rotation N. The rate of rotation N of each rotor 8 is set to be the same, but the rates of rotation N of the rotors 8 can be different from each other. There is no particular limitation on the form of the rotor 8, and various types of form can be adopted, such as tangential type, geared type, or the like. The rotors each have two rotor blades, but the number of blades and their form are determined as necessary.

A floating weight 6 that moves vertically is provided above the rotors 8. The floating weight 6 is arranged in an upward standby position so as not to obstruct the feeding of the kneading materials R when the kneading materials R are fed into the casing 2. After the kneading materials R have been fed into the casing 2, the floating weight 6 is moved downward from the standby position, and arranged in a position that covers the top of the rotors 8 and virtually closes the chamber 7. The kneading materials R include raw rubber and carbon black, and in addition include reinforcing agent other than carbon black, filler, antiaging agent, processing aids, softener, plasticizer, vulcanizing agent, vulcanization accelerator, vulcanization retarder, and the like as appropriate.

When the kneading materials R are being kneaded, the material discharge port 4 provided in a position below the rotors 8 is closed by a discharge port flap 5. When the kneaded kneading materials R are discharged from the material discharge port 4, the material discharge port 4 is opened by moving the discharge port flap 5 to a standby position where it will not obstruct discharge of the kneading materials R. The structures of the floating weight 6 and the discharge port flap 5 are not limited to the structures illustrated. A mixing machine with a so-called kneader structure may be used.

The data measured by the rotation meter 10a and the power meter 10b are input to a calculation device 11 that is configured from a computer or the like, connected to the rotor drive unit 10. Data on the outer diameter D of the rotor 8, the clearance H between the position of the outer diameter of the rotor 8 and the inner wall face 7a of the chamber 7, and data on the filling ratio obtained as the proportion of the volume of the chamber 7 of the kneader 1 occupied by the volume of the kneading materials R are input to the calculation device 11.

In addition, the kneading time T is set in advance in accordance with the mix and quantity of kneading materials R, and data on the kneading time T is input to the calculation device 11. Alternatively, the kneading time T is determined based on the viscosity of the kneading materials R when kneading, and kneading is completed when a predetermined specific viscosity is reached, and the time from start of kneading until completion of kneading is input to the calculation device 11 as kneading time T data. Here, the viscosity of the kneading materials R can be determined from the temperature of the kneading rubber and the rotor drive power.

This embodiment is configured so that data on the position of the floating weight 6 is also input to the calculation device 11. Also, data on the timing of measurement of the evaluation index E and a limiting value Em of the evaluation index E are input to the calculation device 11 in accordance with the mix of the kneading materials R.

If the evaluation index E is used to determine the completion of kneading, information on the so-called preliminary kneading in the initial period of kneading should not be used. The reason for this is because the electrical power in the preliminary kneading includes many disturbances due to the temperature of the raw materials and the kneader. In other words, measurement of the evaluation index E includes the stage of kneading the raw rubber and the carbon black, and the stage of making the kneading rubber uniform. Therefore, the timing for starting measurement of the evaluation index E is provided as input data.

The limiting value Em is the limiting value (lower limit value) of the evaluation index E at which it can be determined that the kneader 1 is kneading properly when mixing that mix of kneading materials R, and is a value determined in advance by carrying out test kneading for each mix. Also, the calculation device 11 is configured to compare the limiting value Em and the calculated evaluation index E.

When the kneading materials R are being kneaded, the total amount of shear J indicated by the following equation (1) is calculated by the calculation device 11. In other words, the total amount of shear J is calculated by integrating the shear velocity γ applied to the kneading materials R by the rotor 8 that is being driven to rotate, over the kneading time T.

$$\text{Total amount of shear } J = \int (\gamma) dt \tag{1}$$

Here, the shear velocity γ=shear coefficient K×rate of rotation N of rotor, and the shear coefficient K=π×rotor outer diameter D/clearance H.

Also, the calculation device 11 calculates the unit work UW indicated by the following equation (2). In other words, the unit work UW is calculated by dividing the integrated power W obtained by integrating the instantaneous power p required to drive the rotation of the rotors 8 over the kneading time T, by the mass M of the kneading materials R.

$$\text{Unit work } UW = \text{integrated power } W/\text{Mass of mixing materials } M \tag{2}$$

Here, the integrated power $W = \int (p) dt$.

Also, the calculation device 11 calculates an evaluation index E by dividing the unit work UW by the total amount of shear J, as shown in the following equation (3).

Evaluation index $E$=unit work UW/total amount of shear $J$ (3)

The total amount of shear J is the so-called amount of work input when kneading. Also, the total amount of shear J can be obtained by approximation to good accuracy by substituting the rotor outer diameter D, the clearance H (or the inner diameter of the chamber 7), the rate of rotation N of the rotor, and the kneading time T into equation (1). Also, the unit work UW is the so-called amount of work output when kneading. The unit work UW can be determined by measurement by the power meter 10b.

Therefore, the value of the evaluation index E is the amount of work output relative to the amount of work input when kneading. Here, the total amount of shear J is a virtual value calculated by approximation, and the actual total amount of shear Jr is Jr=kneading efficiency β×total amount of shear J. The kneading efficiency β is a value that varies in accordance with the specification and the like of the rotors 8, and is greater than 0 and less than or equal to 1. Also, if equation (3) is modified, the following equation (4) is obtained.

Evaluation index $E$=kneading efficiency β×(unit work UW/actual total amount of shear $Jr$) (4)

Provided the mixing proportions of the kneading materials R are the same, the kneading materials R after kneading obtained by a predetermined input of kneading will be the same, so the value of "unit work UW/actual total amount of shear Jr" is considered to be a constant (characteristic value) of that mix of kneading materials R. Accordingly, the evaluation index E indicates the extent of the kneading efficiency, and the larger the number the better the kneading efficiency. The evaluation index E can be easily calculated from the above equation (1), equation (2), and equation (3), so it is possible to simply and accurately determine the extent of the kneading efficiency of the kneader 1.

For example, in some cases, raw rubber and an equal quantity of carbon black are mixed as the material to form the tube rubber (inner layer rubber) for a rubber hose, and during kneading, it becomes very hard compared with the kneading materials R for normal rubber. Therefore, an excessive load is applied to the kneader 1, and the kneading efficiency is also greatly affected. When the kneading system according to the present technology is used, it is possible to determine the extent of the kneading efficiency of the kneader 1, even with the kneading materials R that will form the tube rubber, which has the advantages that the appropriate kneading conditions can be easily set, and it is possible to prevent breakdown of the kneader 1.

The following is the procedure for kneading the kneading materials R using the kneading system according to the present technology.

First, a predetermined quantity of raw rubber, carbon black, and various other constituent materials are fed into the casing 2 through the material feeding port 3. Then, the floating weight 6 is moved downward from the standby position and arranged so as to close and cover the top of the rotors 8.

In this state, the kneading materials R that have been fed are kneaded by the two rotors 8 that are driven to rotate within the space enclosed by the inner wall face 7a of the chamber 7, the discharge port flap 5, and the floating weight 6. Also, for example, after the initial raw rubber has been kneaded, successively softener or plasticizer, and carbon black are fed into the casing 2 (chamber 7) and kneaded. After the kneading materials R have been kneaded to a predetermined state and the kneading is completed, the material discharge port 4 is opened by moving the discharge port flap 5 to the standby position, and the kneading materials R are discharged outside the kneader 1.

From the time of commencement of kneading of the kneading materials R until the time of completion of kneading, the rate of rotation N of the rotors 8 (rotor shaft 9) is successively measured by the rotation meter 10a, and the instantaneous power p required to drive the rotation of the rotors 8 is successively measured by the power meter 10b. The data measured by the rotation meter 10a and the power meter 10b are input to the calculation device 11. Also, the evaluation index E is successively calculated by the calculation device 11.

Figure 4:
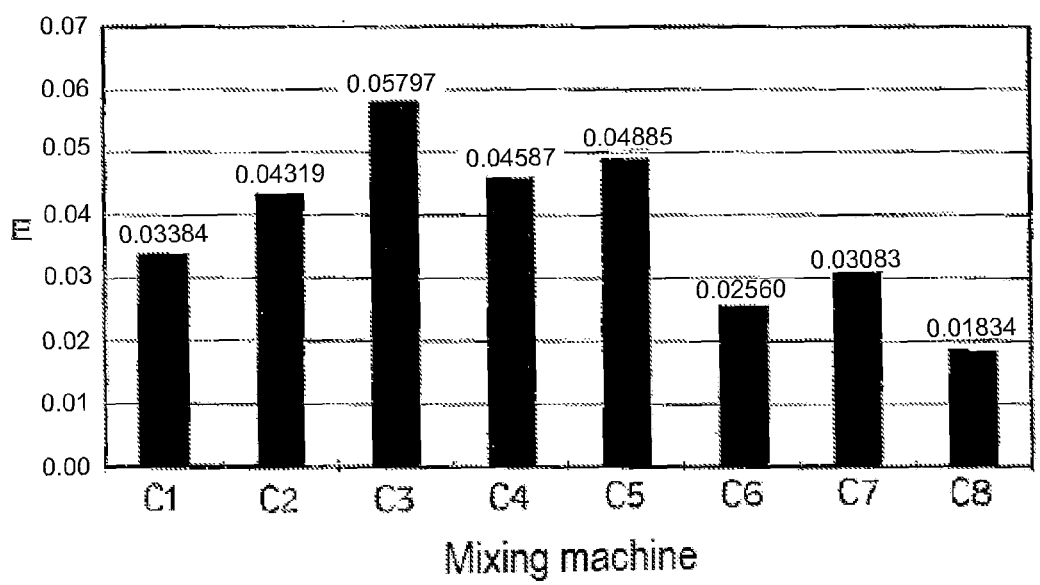
FIG. 4 is a graph showing the evaluation index for a plurality of kneading system kneaders according to the present technology.

FIG. 4 shows the evaluation index E when kneading systems according to the present technology with a kneader 1 with eight different specifications (model C1 to model C8) knead the same kneading materials R under the same conditions to the same state. The same conditions means that the filling ratio is the same, and the sequence and the timing of feeding the kneading materials are the same. The filling ratio for each of the kneaders 1 in FIG. 4 is about 60%.

From the results in FIG. 4, it can be seen that of the eight models, the kneader 1 of model C3 has the best kneading efficiency, and the kneader of model C8 has the worst kneading efficiency. For kneading with an emphasis on kneading efficiency only, the kneading system with the kneader 1 of model C3 will be selected.

Figure 5:
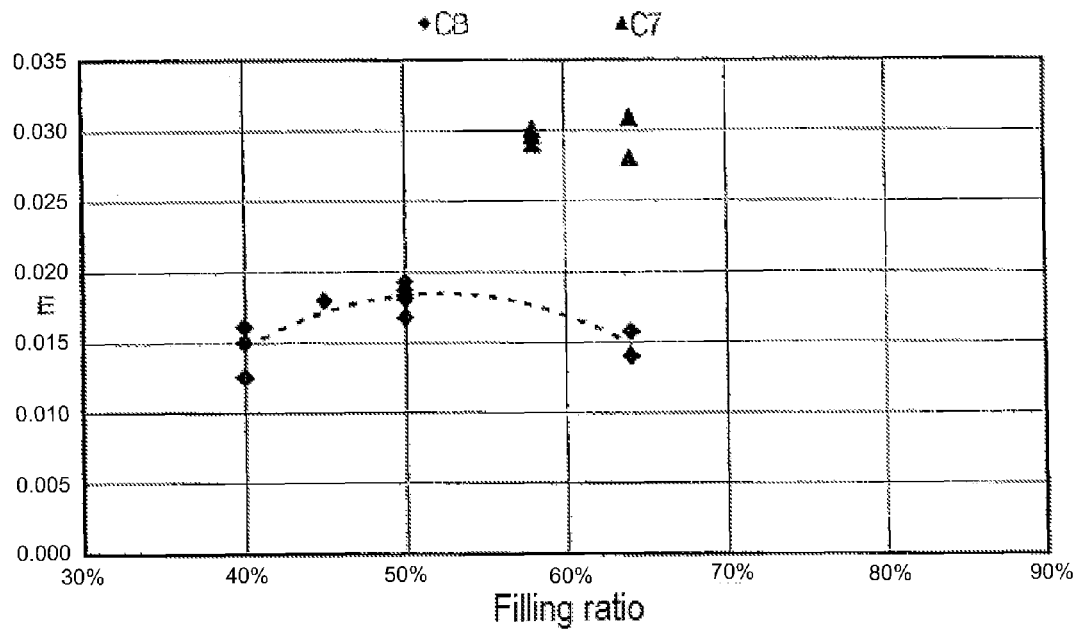
FIG. 5 is a graph showing the relationship between the filling ratio of the kneading materials in a plurality of kneading system kneaders according to the present technology and the evaluation index.

FIG. 5 shows the evaluation index E when kneading systems according to the present technology with a kneader 1 with two different specifications (model C7, model C8) knead the same kneading materials R, with the same feeding sequence and timing, to the same state, but with different filling ratios. From the results in FIG. 5, it can be seen that the evaluation index E does not vary greatly due to differences in the filling ratio in the kneaders 1 of model C7 and model C8, but stays within a virtually constant range. Also, it can be seen that the kneading efficiency of the kneader 1 of model C7 is better than that of the kneader 1 of model C8.

Figure 6:
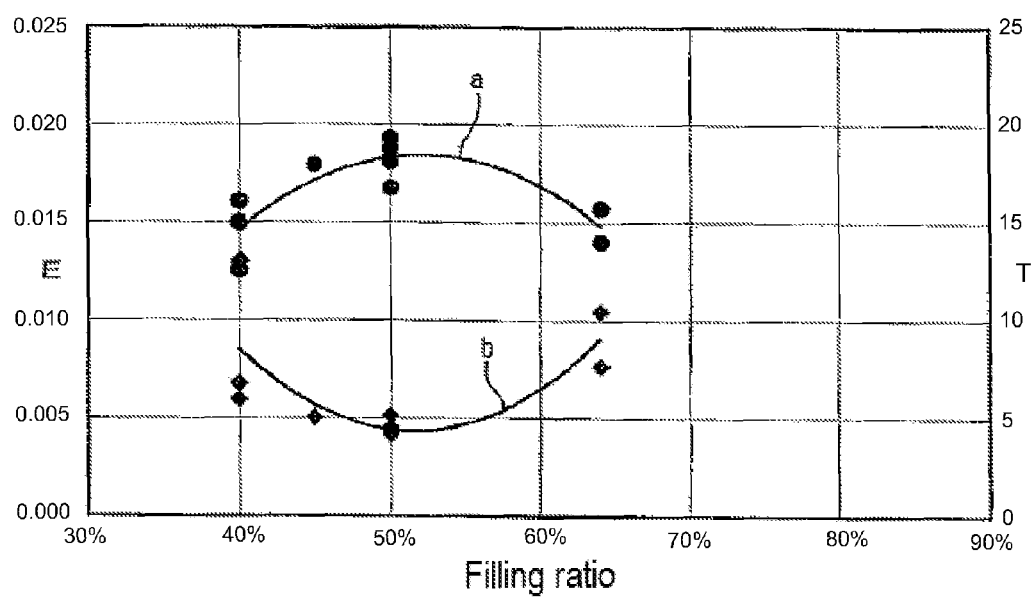
FIG. 6 is a graph showing the relationship between the evaluation index and the kneading time for filling ratios of kneading materials in the kneading system according to the present technology of a certain kneader.

FIG. 6 shows the evaluation index E (curve a) when certain kneading materials R are kneaded by the kneading system according to the present technology with the kneader 1 of model C10 to a predetermined condition with different filling ratios. Curve b shows the relationship between the filling ratio and the kneading time T in this case.

By comparing the evaluation indices E, it is possible to compare the kneading efficiency of the kneader 1 of model C10 at a plurality of filling ratios. In other words, when the same kneading materials R are kneaded by a kneader 1 of the same specification to the same state but with different filling ratios, it is possible to determine the filling ratio to enable kneading with the best efficiency. In the kneader 1 of model C10, it is possible to minimize the time required for kneading by setting the filling ratio to about 50%, and to determine that this gives the best kneading efficiency.

Figure 7:
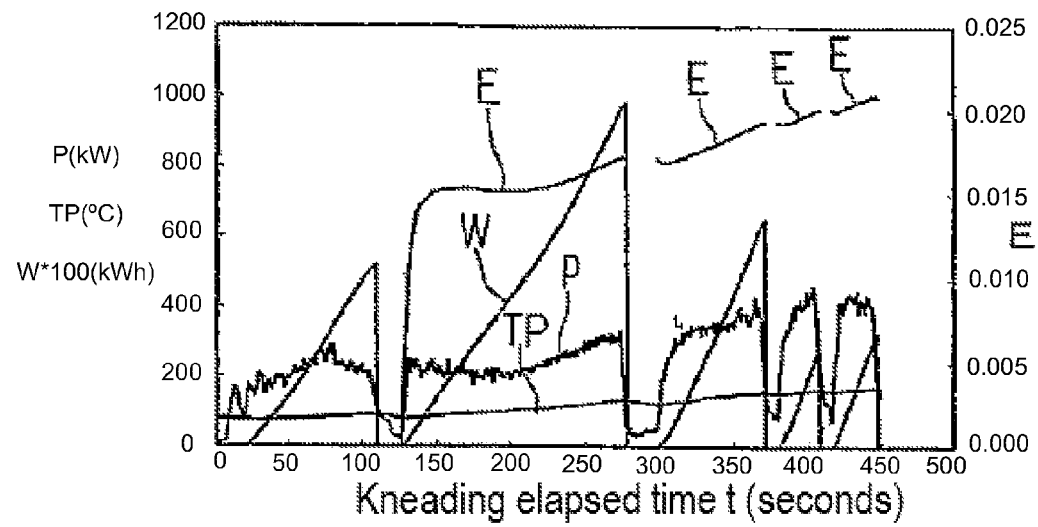
FIG. 7 is a graph showing the evaluation index time history for a kneading system according to the present technology with a certain kneader.

FIG. 7 shows the time history of the evaluation index E when certain kneading materials R are kneaded to a predetermined state with a certain filling ratio (60%) using the kneading system according to the present technology with the kneader 1 of model C10. The time history of the instantaneous power p, the integrated power W, and the kneading materials R temperature TP in this case are also shown. In the kneading process in FIG. 7, the kneading operation is carried out intermittently 5 times, from the start of kneading until the completion of kneading, in order to feed the various constituent materials, operate the floating weight 6, and the like, but the initial kneading operation is a preliminary kneading in which all the constituent materials have not been fed. Therefore, the present technology is applicable to the second and subsequent kneading operations (kneading operations in which all the constituent materials are fed). Data on the position of the floating weight 6 is input to the calculation device 11, so it is possible to determine from the position data whether in the evaluation index E time history data, the floating weight 6 is in a position covering the top of the rotors 8 in the position and closing the chamber 7, or, whether it is in the standby position.

From the results of FIG. 7, in the kneading by the kneader 1 of model C10, it can be seen that the evaluation index E continues to increase until the completion of kneading, the kneading materials R are slowly kneaded over a long period of time, and the kneading efficiency is not good. Also, it can be seen that the heat buildup in the kneading materials R during kneading is low.

Figure 8:
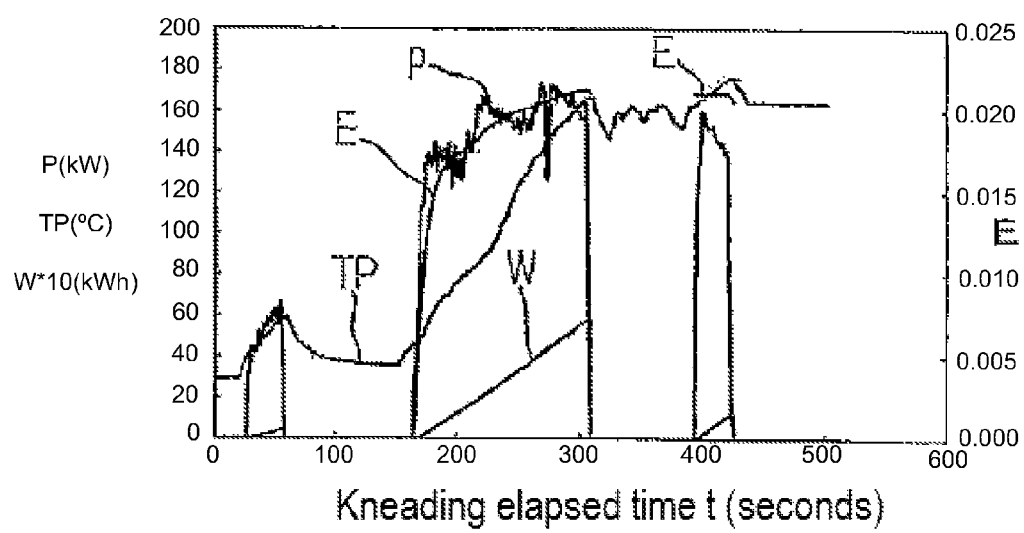
FIG. 8 is a graph showing the evaluation index time history for a kneading system according to the present technology with another kneader.

FIG. 8 shows the time history of the evaluation index E when certain kneading materials R are kneaded to a predetermined state with a certain filling ratio (50%) using the kneading system according to the present technology with the kneader 1 of model C11. The time history of the instantaneous power p, the integrated power W, and the kneading materials R temperature TP in this case are also shown. In the kneading process in FIG. 8, the kneading operation is carried out intermittently 3 times, from the start of kneading until the completion of kneading, in order to feed the various constituent materials, operate the floating weight 6, and the like. The initial kneading operation is a preliminary kneading in which all the constituent materials have not been fed. Therefore, the present technology is applicable to the second and subsequent kneading operations (kneading operations in which all the constituent materials are fed).

From the results of FIG. 8, in the kneading by the kneading system with the kneader 1 of model C11, the evaluation index E suddenly increases during the kneading operation, and thereafter, is virtually constant, so in a short period of time, the kneading materials R have been kneaded, and it can be seen that the kneading efficiency is good. Also, it can be seen that during kneading the heat buildup in the kneading materials R is high.

From the results of FIG. 7 and FIG. 8, for example, when kneading kneading materials R that have no problems with quality even if there is high heat buildup, by using the kneading system according to the present technology with the kneader 1 of model C11 to carry out the kneading, it is possible to efficiently knead in a short period of time. On the other hand, when kneading kneading materials R that have problems with quality if there is high heat buildup, by using the kneading system with the kneader 1 of model C10 to carry out the kneading, it is possible to complete the kneading without lowering the quality.

If kneading materials R that have problems with quality if there is high heat buildup are kneaded using the kneading system with the kneader of model C11, for example, the rate of rotation N of the rotors 8 is reduced in order to suppress the heat buildup, thereby reducing the kneading efficiency. In other words, the kneading conditions are set so that the evaluation index E is reduced. By successively calculating the evaluation index E in this way, and determining the kneading efficiency time history, it is possible to easily set the optimum kneading conditions.

Also, if the calculated evaluation index E deviates from the limiting value Em (if it is lower than the limiting value Em), it is possible to determine that a fault (breakdown) has occurred to the kneader 1. Therefore, a fault notification means may be provided that enables the operator to be reliably informed of a fault in the event that the value of the calculated evaluation index E deviates from the limiting value Em.

In addition, by comparing the evaluation index E when the same kneading materials R are kneaded using the kneading system with a certain kneader 1 under the same conditions and to the same state between kneading batches (lots), it is possible to determine the stability of the kneading state. In other words, the smaller the variation in the evaluation index E for each kneading batch (lot), the more it can be determined that the kneading is stable between batches (lots).

What is claimed is:

1. A kneading system with a closed-type rubber kneader, comprising:
a closed-type rubber kneader that kneads kneading materials that include raw rubber and carbon black;
a rotation meter that measures the rate of rotation of a rotor of the kneader;
a power meter that measures the instantaneous power required to drive the rotation of the rotor; and
a calculation device to which the measurement data of the rotation meter and the power meter are input, based on the input measurement data, data on the outer diameter of the rotor, data on the clearance between the position of the outer diameter of the rotor and the inner wall face of a chamber that contains the rotor, the calculation device calculating the total amount of shear by integrating the shear velocity applied to the kneading materials by the rotor over the kneading time, calculating a unit work by dividing the integrated power obtained by integrating the instantaneous power over the kneading time by the mass of the kneading materials, and based on the total amount of shear and the unit work, calculating an evaluation index that evaluates the kneading efficiency of the kneader.

2. The kneading system with a closed-type rubber kneader according to claim 1, wherein the evaluation index is successively calculated.

3. The kneading system with a closed-type rubber kneader according to claim 1, wherein data on the position of a floating weight that is provided above the rotor, and when kneading is carried out, the floating weight is moved downward and arranged in a position to cover the top of the rotor and close the chamber, and when kneading materials are fed, it is moved upward to a standby position, is input to the calculation device.

4. The kneading system with a closed-type rubber kneader according to claim 1, wherein a limiting value of the evaluation index in accordance with the mix of the kneading materials is input to the calculation device, and the limiting value is compared with the calculated evaluation index.

5. The kneading system with a closed-type rubber kneader according to claim 2, wherein data on the position of a floating weight that is provided above the rotor, and when kneading is carried out, the floating weight is moved downward and arranged in a position to cover the top of the rotor and close the chamber, and when kneading materials are fed, it is moved upward to a standby position, is input to the calculation device.

6. The kneading system with a closed-type rubber kneader according to claim 5, wherein a limiting value of the evaluation index in accordance with the mix of the kneading materials is input to the calculation device, and the limiting value is compared with the calculated evaluation index.

7. The kneading system with a closed-type rubber kneader according to claim 2, wherein a limiting value of the evaluation index in accordance with the mix of the kneading materials is input to the calculation device, and the limiting value is compared with the calculated evaluation index.

8. The kneading system with a closed-type rubber kneader according to claim 3, wherein a limiting value of the evaluation index in accordance with the mix of the kneading materials is input to the calculation device, and the limiting value is compared with the calculated evaluation index.

* * * * *